US009527351B2

United States Patent
Hsu et al.

(10) Patent No.: US 9,527,351 B2
(45) Date of Patent: Dec. 27, 2016

(54) SETTING METHOD FOR A TIRE DETECTION DATA TRANSMISSION SYSTEM

(71) Applicant: ORANGE ELECTRONIC CO., LTD., Taichung (TW)

(72) Inventors: Chin-Yao Hsu, Taichung (TW); Chang-Hsuan Chan, Taichung (TW)

(73) Assignee: ORANGE ELECTRONIC CO., LTD., Taichung (TW)

( * ) Notice: Subject to any disclaimer, the term of this patent is extended or adjusted under 35 U.S.C. 154(b) by 0 days.

(21) Appl. No.: 14/808,841

(22) Filed: Jul. 24, 2015

(65) Prior Publication Data

US 2015/0328943 A1    Nov. 19, 2015

Related U.S. Application Data

(62) Division of application No. 13/541,219, filed on Jul. 3, 2012, now abandoned.

(51) Int. Cl.
*B60C 23/04* (2006.01)

(52) U.S. Cl.
CPC ....... *B60C 23/0447* (2013.01); *B60C 23/0479* (2013.01)

(58) Field of Classification Search
CPC .................................. B60C 23/0447
USPC ............................... 340/442–447
See application file for complete search history.

(56) References Cited

U.S. PATENT DOCUMENTS

| | | |
|---|---|---|
| 6,408,232 B1 | 6/2002 | Cannon et al. |
| 6,639,519 B2 | 10/2003 | Drummond et al. |
| 6,754,562 B2 | 6/2004 | Strege et al. |
| 6,825,758 B1 | 11/2004 | Laitsaari |
| 6,921,197 B2 | 7/2005 | Aubel et al. |
| 6,970,073 B2 | 11/2005 | Drummond et al. |
| 7,113,127 B1 | 9/2006 | Banet et al. |
| 7,299,127 B2 | 11/2007 | Willer et al. |
| 7,839,833 B2 | 11/2010 | Linsky et al. |
| 8,068,952 B2 | 11/2011 | Valentine et al. |
| 2007/0193348 A1 | 8/2007 | Rutherford et al. |
| 2009/0224901 A1 | 9/2009 | Yu |
| 2010/0066524 A1* | 3/2010 | Yu ...................... B60C 23/0408 340/447 |
| 2010/1020775 | 8/2010 | Sugiura |

(Continued)

FOREIGN PATENT DOCUMENTS

| | | |
|---|---|---|
| TW | 200916343 | 4/2009 |
| TW | 200918354 | 5/2009 |
| TW | M400954 | 4/2011 |

*Primary Examiner* — Brent Swarthout
(74) *Attorney, Agent, or Firm* — Muncy, Geissler, Olds & Lowe, P.C.

(57) ABSTRACT

A tire detection data transmission system and the setting method thereof include at least one monitoring device, for detecting the condition of vehicle tires and generating tire information, which is transmitted via a RF signal to a transfer device. The transfer device then uses a Bluetooth signal to transmit the received tire information to a mobile communication device. The RF signal emitted by the monitoring device includes at least the tire information and the identification code of the monitoring device. The identification code makes subsequent updates to the settings of the monitoring device simpler and more convenient.

9 Claims, 8 Drawing Sheets

(56) References Cited

U.S. PATENT DOCUMENTS

2014/0361884 A1* 12/2014 Yu ...................... B60C 23/0433
340/447
2015/0343859 A1* 12/2015 Yu ...................... B60C 23/0461
340/447

* cited by examiner

SETTING METHOD FOR A TIRE DETECTION DATA TRANSMISSION SYSTEM

CROSS-REFERENCE TO RELATED APPLICATIONS

This application is a Divisional of co-pending application Ser. No. 13/541,219, filed on Jul. 3, 2012, now abandoned, for which priority is claimed under 35 U.S.C. §120, the entire contents of which are hereby incorporated by reference.

BACKGROUND OF THE INVENTION

Field of Invention

The invention relates to a detection system of vehicle tires and, in particular, to a tire detection data transmission system and the setting method thereof.

Related Art

Earlier inventions of tire pressure detection systems have been disclosed in ROC Pat. No. M400,954 and US Pat. No. US2007/0193,348, U.S. Pat. No. 6,408,232, U.S. Pat. No. 6,639,519, U.S. Pat. No. 6,754,562, U.S. Pat. No. 6,970,073, U.S. Pat. No. 7,113,127, U.S. Pat. No. 7,299,127, U.S. Pat. No. 7,839,833, and U.S. Pat. No. 8,068,952.

The tire pressure detection system disclosed in the U.S. Pat. No. 6,921,197 mainly provides a signal capture device at each of the four tires of a vehicle. The signal capture device has the function of detecting tire pressure and transmits the tire pressure in a wireless means to a screen near the dashboard of the vehicle. However, this screen is usually a fixed at a specific location, almost does not have any mobility. Therefore, to observe the tire pressure, the user has to stay within the car. This is really inconvenient. There is also the problem of unsatisfactory space utilization and design.

The tire pressure detection system disclosed in the U.S. Pat. No. 6,825,758 also provides a signal capture device on each of the four tires of a vehicle. The signal capture device has a sensor, a Bluetooth (BT) signal transmitter, and a battery. The sensor measures the tire pressure and emits the tire pressure signal to a mobile phone via a BT signal transmitter. The user is thus able to observe the tire pressure condition of the car. Although this technique of mobile phone observation has the advantages of portability and mobility, there are still some problems. That is, the signal capture device uses exclusively BT signals for data transmission. Since BT transmissions consume more electrical power, the battery power will be quickly depleted. Therefore, the user has to constantly replace the battery of the signal capture device. Nevertheless, such signal capture devices are installed on the tires. To avoid moisture failure, the signal capture devices are designed to be completely sealed. This renders direct replacement of the battery almost impossible. As a result, one is bound to replace the entire set of signal capture device.

In ROC Pat. Nos. 200,916,343 and 200,918,354, although the BT transmission method is disclosed to transmit the tire pressure signal of the signal capture device to a remote mobile communication device, there is no mention about the signal provision method and features of related structures. Therefore, it is unclear how to implement their ideas. Moreover, usual signal capture devices are set to enter their setting mode when a special condition is detected (e.g., when a tire keeps releasing its pressure). Therefore, when replacing a new signal capture device, it is complicated and inconvenient to reset its reception method. For of U.S. Pat. No. 6,825,758 or ROC Pat. Nos. 200,916,343 and 200,918,354, there is always the technical problem regarding how to reset the reception.

SUMMARY OF THE INVENTION

One objective of the invention is to provide a tire detection data transmission system and the setting method thereof, in which RF signals are used to transmit signals between the monitoring device and the transfer device thereof. The RF transmission is superior to the BT transmission in its lower power consumption. Therefore, the invention can effectively extend the usage time of the monitoring device.

Another objective of the invention is to provide a tire detection data transmission system and the setting method thereof, which can accurately transmit tire information to the mobile communication device for the mobile communication devices to actively or passively obtain the tire information.

A third objective of the invention is to provide a tire detection data transmission system and the setting method thereof that enable a simpler and more convenient way to update the settings of the monitoring device.

To achieve the above-mentioned objectives, the disclosed tire detection data transmission system includes:

at least one monitoring device that includes a sensor, a signal converter and an RF transmitter; wherein the sensor detects the tire condition of the vehicle and generates tire information, the tire information is converted by the signal converter into the form of RF signals and then transmitted out by the RF transmitter, and the emitted RF signal includes at least the tire information and the identification (ID) code of the monitoring device;

a transfer device that includes an RF receiver, a central processing unit (CPU) and a BT module; wherein the transfer device uses the RF receiver to receive the RF signal emitted by the monitoring device, the CPU collects the received RF signals into collective data, the collective data are then converted by the BT module into BT signals and transmitted out; and a mobile communication devices that includes a BT device, executable software, and a display unit; wherein the mobile communication device receives the BT signal emitted by the BT module via the BT device thereof, the received BT signals are restored to the collective data and sent to the executable software, and the executable software separates the collective data into the tire information and the corresponding ID code, which are then displayed on the display unit.

Furthermore, the CPU has an RF decoding unit, a data holding unit, and a data integration unit. The CPU uses the RF decoding unit to decipher the RF signal received by the RF receiver, and restores the tire information and the corresponding ID code. Both of them are stored in the data holding unit. The data holding unit can accommodate multiple sets of tire information and can be overwritten. According to the coding, only the last tire information is retained. The data integration unit collects the multiple sets of tire information in the data holding unit into the collective data an outputs them to the BT module.

Preferably, the CPU further has a tire condition judging unit and an alarm unit. The tire condition judging unit is preset with a default value to be compared with the tire information in the data holding unit. When the tire information exceeds the range of the default value, the tire condition judging unit passes an alarm signal to the alarm unit for the alarm unit to generate an alert action.

Furthermore, the executable software includes a receiving program, an analysis program, and a display program. The receiving program receives the collective data restored by the BT device. The analysis program breaks the collective data into the multiple sets of tire information and the corresponding ID codes. The display program then shows the tire information according to the respective ID code in the corresponding display block. According to the ID code, only the last corresponding tire information is displayed.

Preferably, the executable software has a trigger program to generate a data reading command for the BT device. The trigger program can be set to start concurrently with the executable software, or to be started by the user when the executable software is running.

Furthermore, the display program has a touch-control display interface on the display unit. The touch-control display interface has a graphical interface with the tires. The user can click in the graphical interface to start the trigger program for showing the information of the corresponding tire therein.

The invention further provides the setting method of a tire detection data transmission system, including the steps of:

(a) starting the executable software;
(b) displaying on the display unit a graphical interface for each of the tires, each of the graphical interfaces containing an option of mode setting;
(c) selecting the mode setting option, and entering the ID code of the replaced monitoring device, thereby updating the ID code of the monitoring device of the corresponding tire in the executable software; and
(d) transmitting an updating message from the executable software to the transfer device via the BT device, thereby updating the ID code of the monitoring device of the corresponding tire in the transfer device.

In addition, the invention provides another setting method of a tire detection data transmission system, including the steps of:

(a) starting the executable software;
(b) using the display program to display on the display unit a graphical interface for each of the tires, each of the graphical interfaces containing an option of mode setting, the mode setting option further including an item for modifying the communication protocol;
(c) selecting the item for modifying the communication protocol, and entering the communication protocol for the replaced new monitoring device, thereby updating the communication protocol for the monitoring device of the corresponding tire in the executable software; and
(d) transmitting an update message from the executable software to the transfer device via the BT device, thereby updating the communication protocol for the monitoring device of the corresponding tire in the transfer device.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
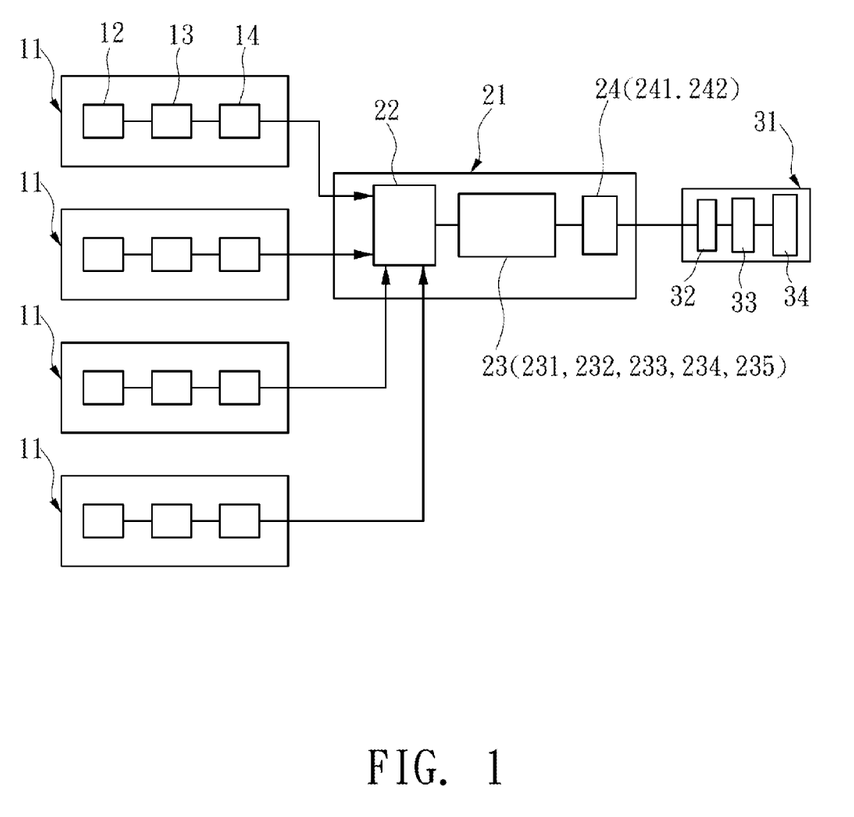
FIG. 1 is a structural block diagram of the invention.

First, please refer to FIG. 1. The invention provides a tire detection data transmission system, mainly composed of at least one monitoring device 11, a transfer device 21, and a mobile communication device 31.

Each of the monitoring devices 11 is installed on a tire of a vehicle to be monitored. Take a usual sedan as an example. Four of the monitoring devices 11 are installed respectively on the four tires of the car. Each of the monitoring devices 11 includes a sensor 12, a signal converter 13, and a radio frequency (RF) transmitter 14. The sensor 12 monitors the tire condition of the car (such as tire pressure, temperature, and so on), and generates tire information. The tire information is first converted by the signal converter 13 into the form of an RF signal, and then emitted by the RF transmitter 14. The RF transmitter 14 can maintain continuous transmission, transmission at specific times, or transmission under specific conditions. The emitted RF signal includes at least the tire information and the identification (ID) code of the monitoring device 11.

The transfer device 21 can use the power circuit of the vehicle itself or the cigarette lighter socket to provide the required power. It can be installed at a hidden place of the car (such as underneath a seat or a place that does not occupy space and block the field of sight). The transfer device 21 includes an RF receiver 22, a central processing unit (CPU) 23 and a Bluetooth (BT) module 24. The transfer device 21 uses the RF receiver 22 to receive the RF signal emitted by the monitoring device 11. The CPU 23 collects the received RF signals into collective data, which are then converted by the BT module 24 into BT signals and sent out.

Figure 2:
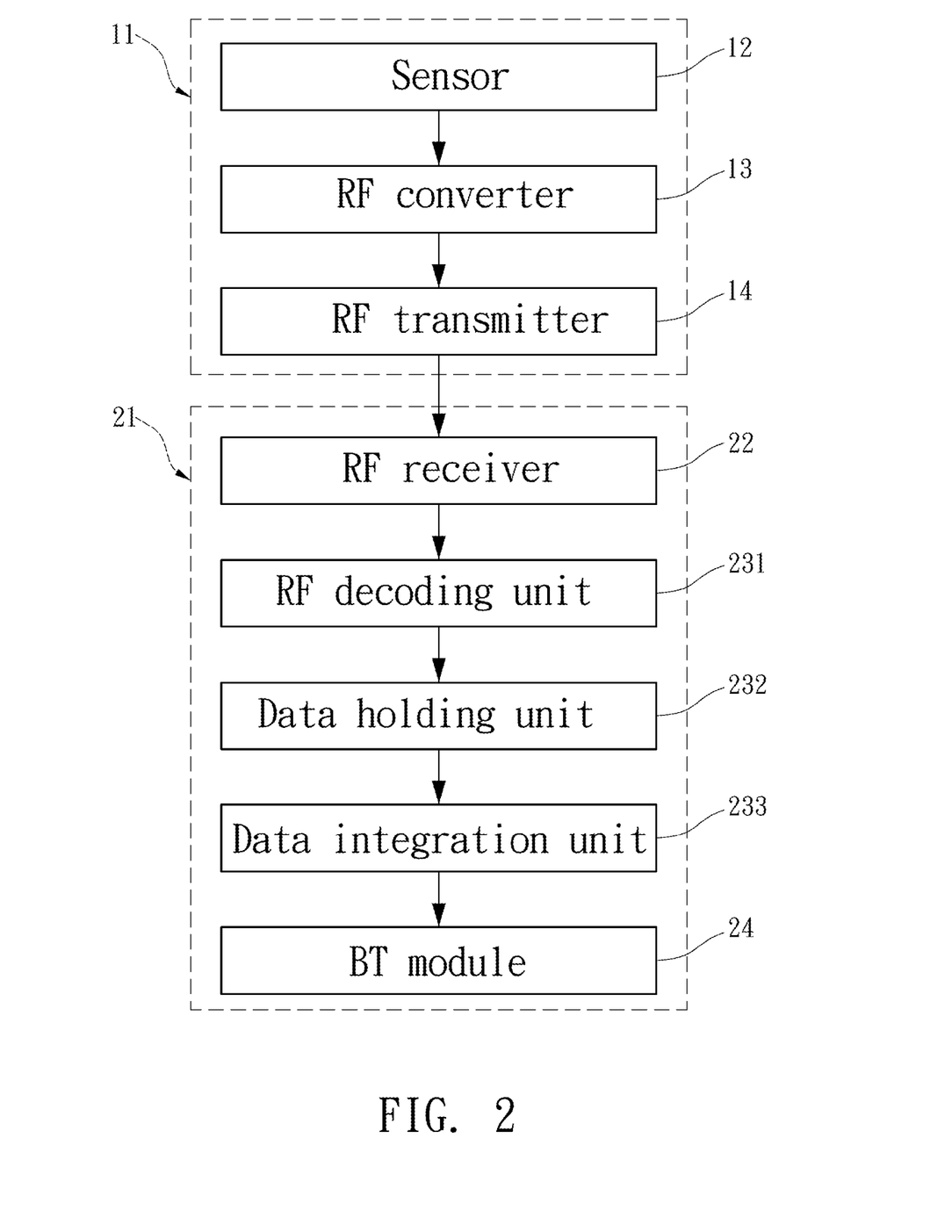
FIG. 2 is an action flowchart of the disclosed monitoring device and transfer device.

The CPU 23 has an RF decoding unit 231, a data holding unit 232, and a data integration unit 233. As shown in FIG. 2, the CPU 23 uses the RF decoding unit 231 to decode the RF signal received by the RF receiver 22 and to restore the tire information and the corresponding ID code in specific coding. The data are then stored in the data holding unit 232. The data holding unit 232 can accommodate multiple sets of tire information and can be overwritten. In accordance with the coding, only the last set of tire information is retained. The data integration unit 233 collects multiple sets of tire information in the data holding unit 232 into the collective data and output them to the BT module 24.

Figure 3:
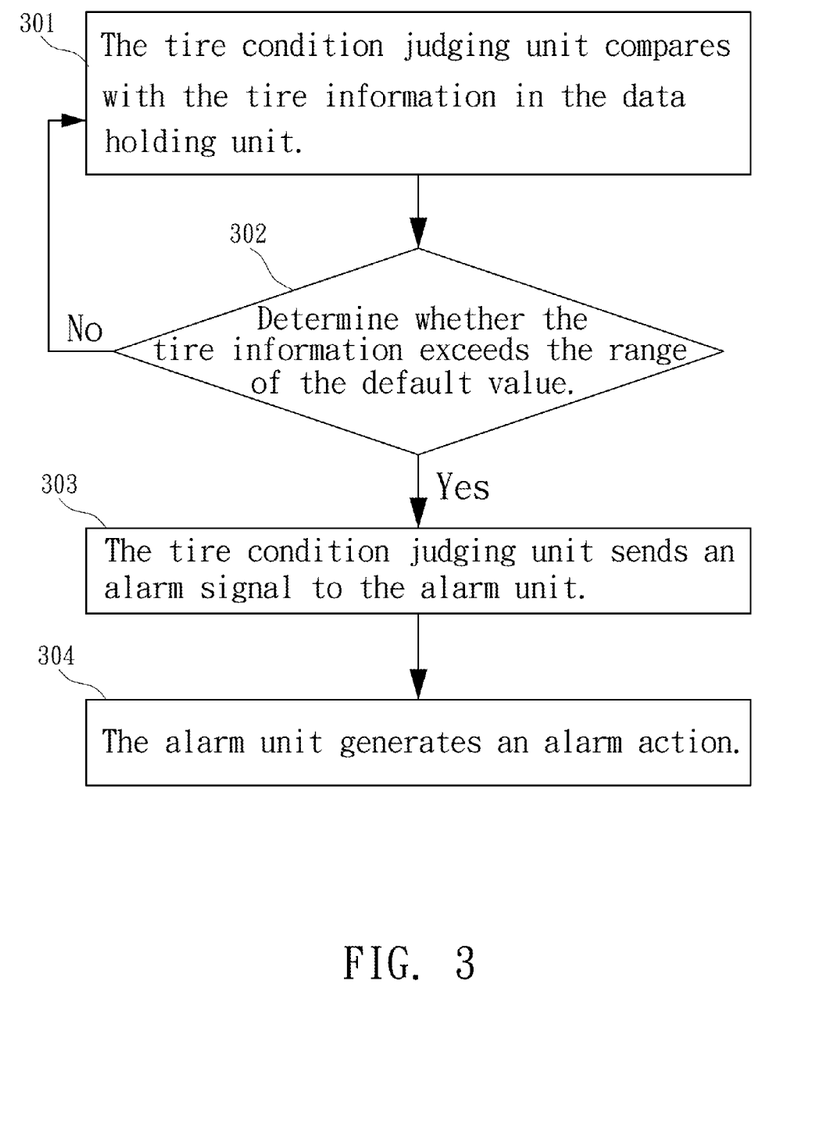
FIG. 3 is an action flowchart of the disclosed tire condition judging unit and the alarm unit.

In the CPU 23, there is further a tire condition judging unit 234 and an alarm unit 235. The time condition judging unit 234 is preset with a default value to be compared with the tire information in the data holding unit 232. As shown in FIG. 3, the procedure is as follows:

(301) The tire condition judging unit 234 compares with the tire information in the data holding unit 232.
(302) Determine whether the tire information goes beyond the range of the default value.

(303) When the tire information goes beyond the range of the default value, the tire condition judging unit 234 passes an alarm signal to the alarm unit 235.

(304) When the alarm unit 235 receives the alarm signal, it produces a corresponding warning action.

In this embodiment, the alarm unit 235 is a buzzer. When the alarm unit 235 receives the alarm signal, it produces a buzzing sound to achieve a warning effect.

Figure 4:
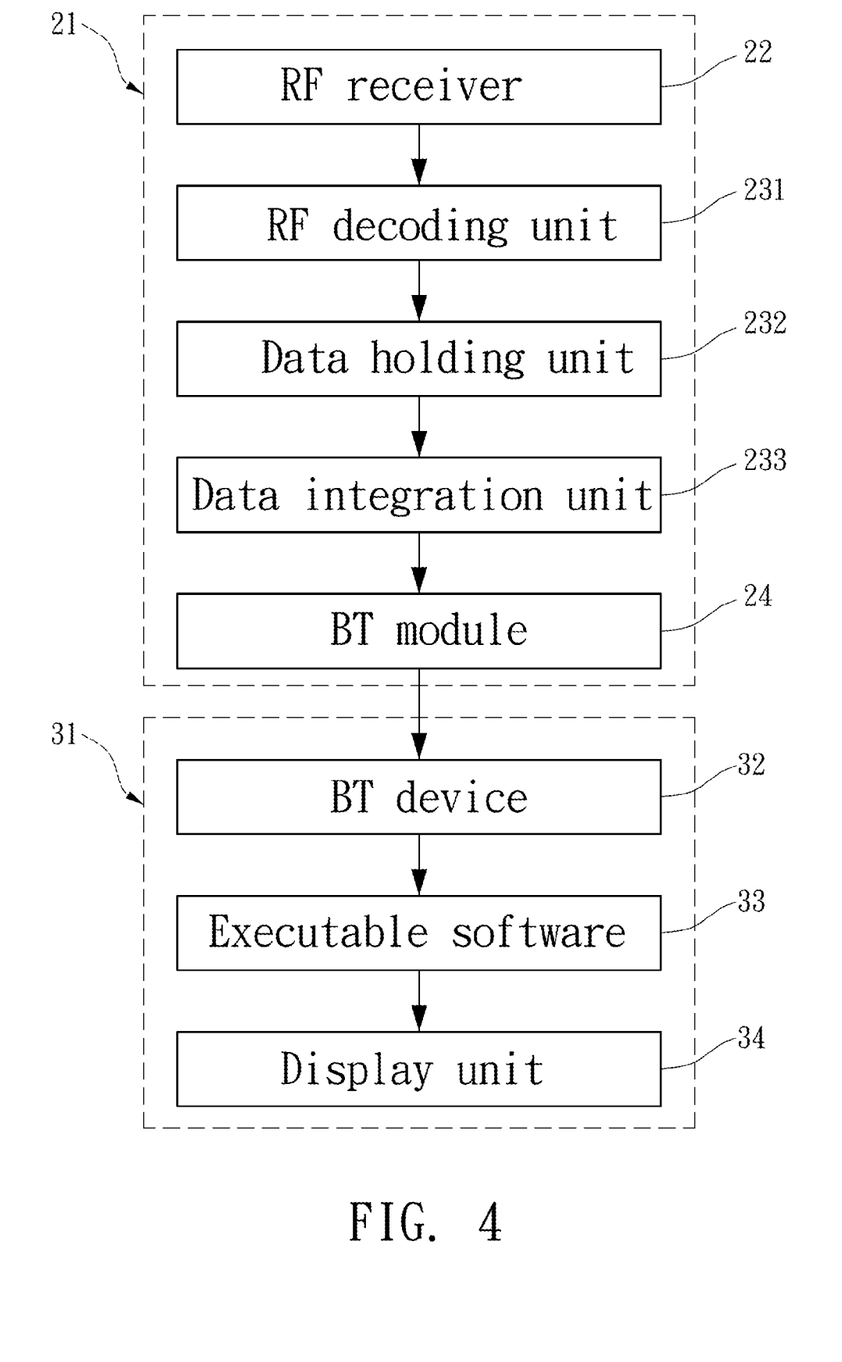
FIG. 4 is an action flowchart of the disclosed transfer device and mobile communication device.

The mobile communication device 31 can be a mobile device such as the mobile phone, PDA, and notebook computer. The mobile device 31 includes a BT device 32, executable software 33, and a display unit 34. As shown in FIG. 4, the mobile communication device 31 uses the BT device 32 thereof to receive the BT signal transmitted by the BT module 24 of the transfer device 21. The BT device 32 restores the received BT signal into the collective data and transmits them to the executable software 33. The executable software 33 breaks the collective data into the tire information and the corresponding ID code, which are then displayed on the display unit 34.

The transfer device 21 uses the BT module 24 thereof to emit a BT pairing message. The BT device 32 of the mobile communication device 31 receives the BT pairing message and generates a corresponding data transmission command to complete the pairing. The BT module 24 has a BT converter 241 and a BT transmitter 242. The BT module 24 uses the BT converter 241 to convert the received collective data into the BT signal. The BT transmitter 242 then emits the BT signal to the paired mobile communication device 31.

Figure 5:
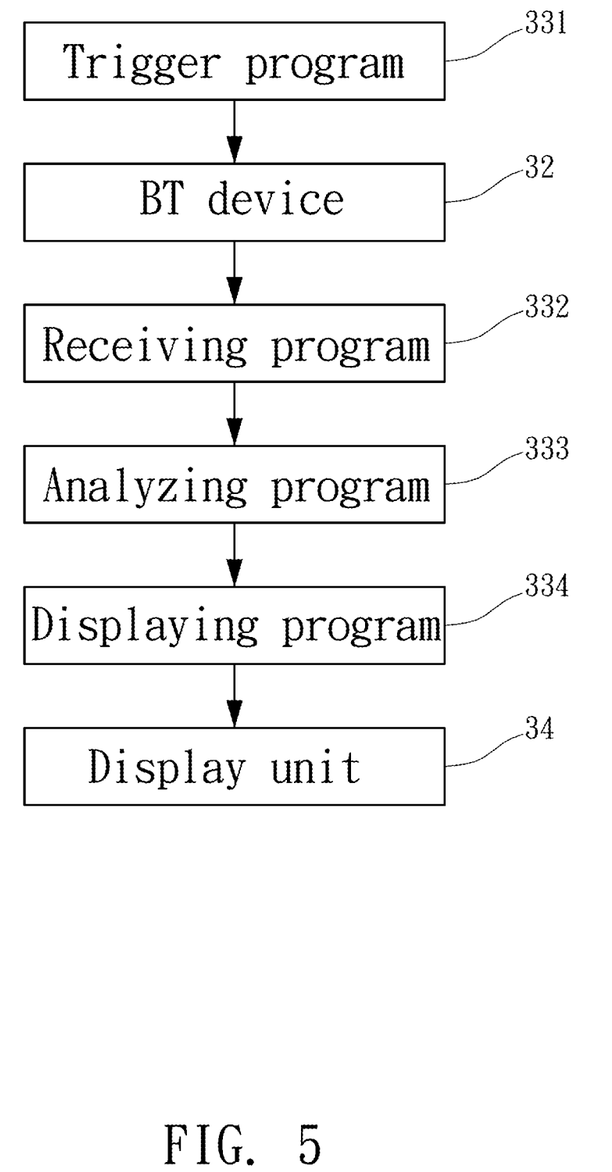
FIG. 5 is a flowchart of the disclosed executable software.

The executable software 33 can be a mini-application (App) or an executable program built in the mobile communication device 31. The executable software 33 includes a trigger program 331, a receiving program 332, an analyzing program 333 and a displaying program 334. As shown in FIG. 5, the trigger program 331 generates a data reading command to the BT device 32. The trigger program 331 can be set to start concurrently when the executable software 33 starts, or to be started by the user when the executable software 33 is running. When the BT device 32 receives the data reading command, the received BT signal is restored to the collective data. The receiving program 332 receives the collective data restored by the BT device 32. The analyzing program 333 is used to break the collective data broken down to multiple sets of tire information and the corresponding ID codes. The displaying program 334 then shows each set of tire information and the corresponding ID code in the corresponding block on the display unit 34. According to the coding, only the last set of tire information is displayed.

Figure 6:
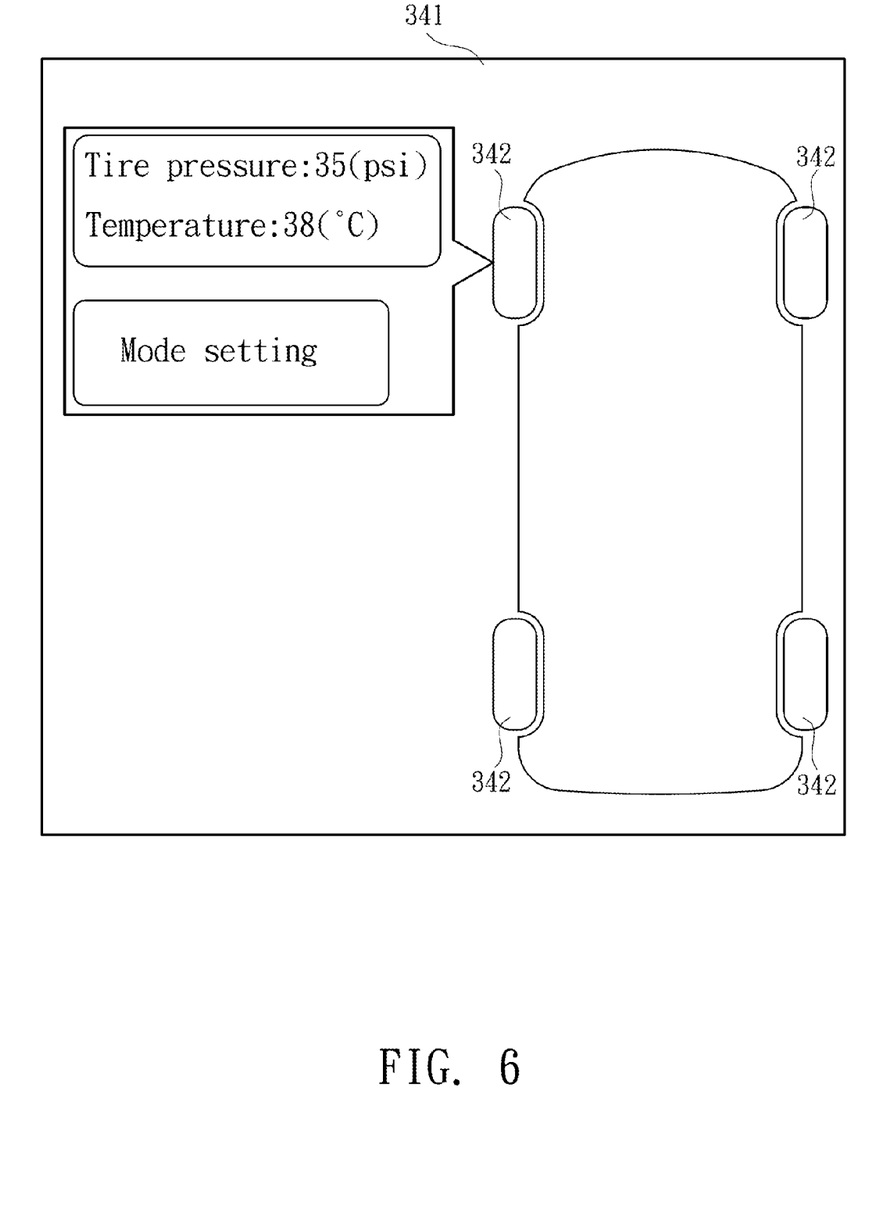
FIG. 6 is a schematic view of the invention in use.

Furthermore, the display unit 34 can be a touch-control screen, as shown in FIG. 6. The displaying program 334 has a touch-control display interface 341 shown on the display unit 34. The touch-control display interface 341 has a graphical interface 342 corresponding to each of the tires. By clicking the graphical interface 342, the user can start the trigger program 331 for the corresponding tire information and the setting mode thereof to be displayed in the graphical interface 342.

With the disclosed structure, the user learns the actual condition of tire pressure in the following way. The transfer device 21 receives the tire pressure and temperature RF signals emitted from the four tires. After collecting them into the collective data, the signal is emitted via Bluetooth to the mobile communication device 31 of the user. The executable software 33 on the mobile communication device 31 the displays the tire information in the formats of pictures, text messages and videos for the user to understand. Therefore, if any tire is out of order, the user can quickly and clearly know about it.

Suppose the trigger program 331 is set to start concurrently with the executable software 31. When the user starts the executable software 31, a data reading command is sent to the BT device 32 at the same time in order to obtain the current tire information and display it on the display unit 34. Now suppose the trigger program 331 is set to be started by the user when the executable software 33 is running before sending data reading commands to the BT device 32. In the case, the user can decide when to know the tire information according to his or her needs. The user starts the trigger program 331 to obtain the current tire information and get it displayed on the display unit 34. Therefore, the invention can actively or passively obtain the tire information according to the user's needs.

Figure 7:
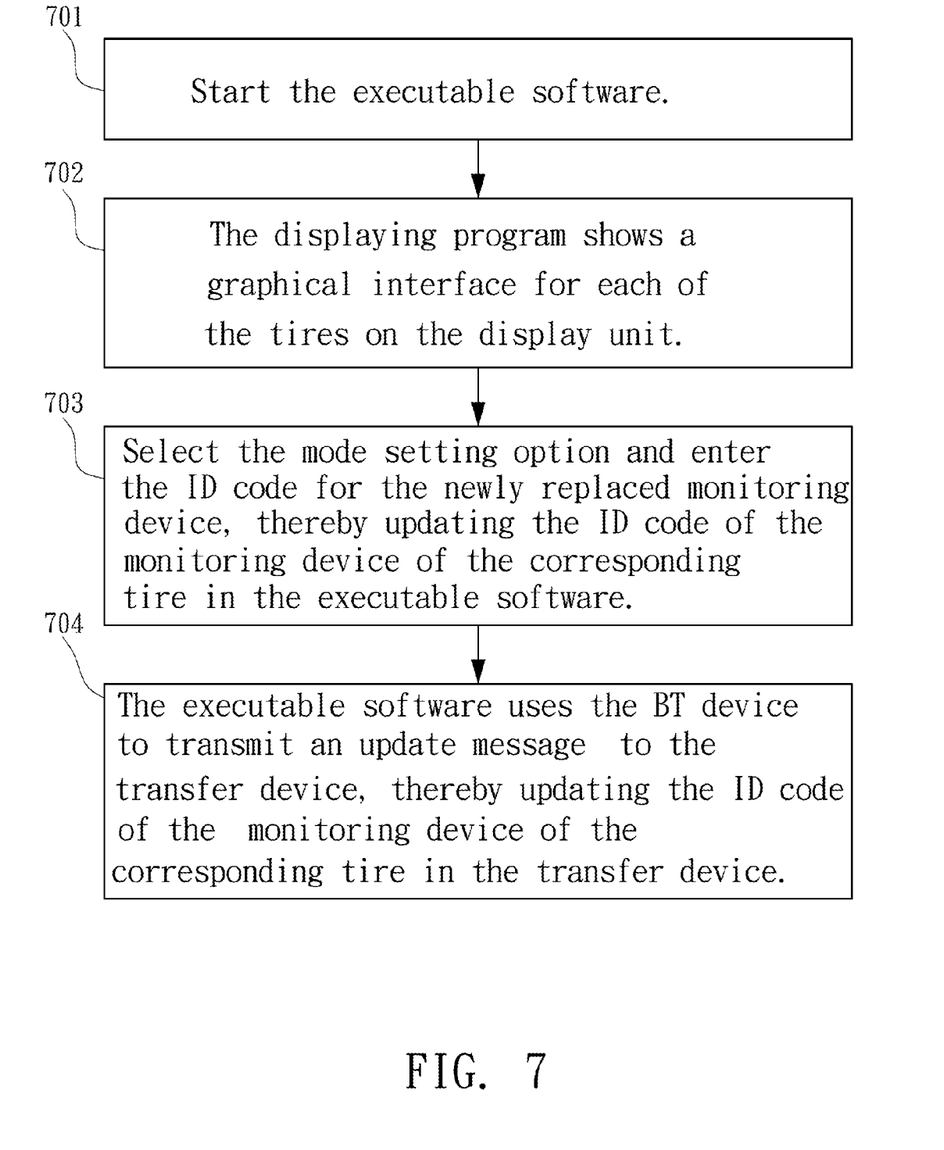
FIG. 7 is a flowchart of a setting procedure after the monitoring device is replaced.

Moreover, in the above-mentioned tire detection data transmission system, the RF signal emitted by the RF transmitter 14 of the monitoring device 11 further includes the ID code of the monitoring device 11, simplifying the setting of a replaced monitoring device 11. As shown in FIG. 7, the setting method includes the following steps:

(701) Start the executable software 33.

(702) Run the displaying program 334 to display on the display unit 34 a graphical interface 342 for the tires, the graphical interface 342 including a mode setting option.

(703) Select the mode setting option, and enter ID code of the newly replaced monitoring device 11, thereby updating the ID code of the monitoring device 11 on the corresponding tire in the executable software 33.

(704) The executable software 33 uses the BT device 32 to transmit an update message to the transfer device 21, thereby updating the ID code of the monitoring device 11 on the corresponding tire in the transfer device 21.

Figure 8:
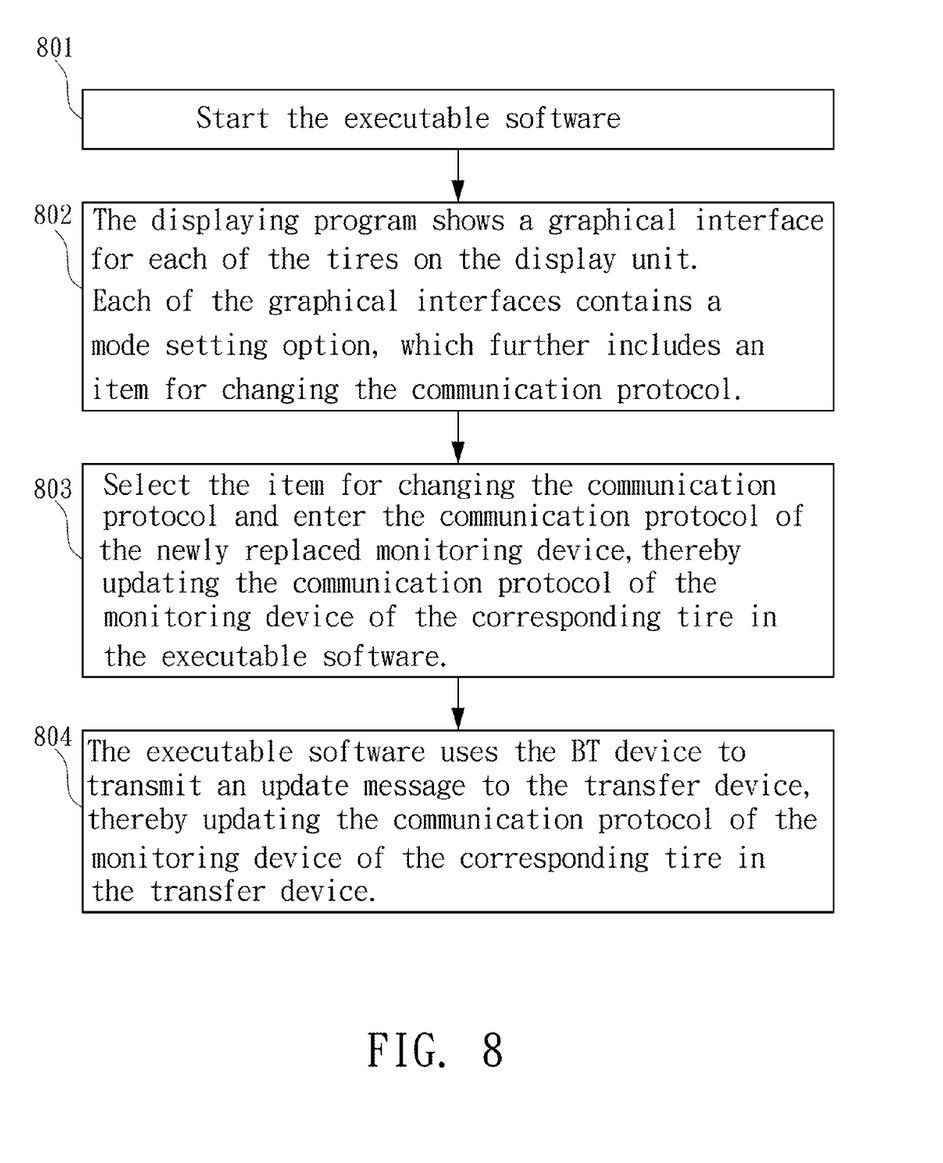
FIG. 8 is a flowchart of another setting procedure after the monitoring device is replaced.

According to the setting method of the replaced monitoring device 11, the mode setting option further includes a protocol changing item. When the user selects the mode setting option, he or she can enter an ID code and a protocol suitable for the newly replaced monitoring device 11, thereby updating the ID code and the protocol for the monitoring device 11 of a tire in the executable software 33. The executable software 33 transmits an update message to the transfer device 21 via BT device 32, thereby updating the monitoring device of ID code and protocol of the monitoring device of tire in the transfer device 21. As shown in FIG. 8, the disclosed setting method of changing the protocol includes the following steps:

(801) Start the executable software 33.

(802) The displaying program 334 shows a graphical interface 342 on the display unit 34 for each of the tires, each of the graphical interfaces 342 including a mode setting option and the mode setting option including a protocol changing item.

(803) Select protocol changing item, and enter the protocol in the newly replaced monitoring device, thereby updating the protocol of the monitoring device 11 of the corresponding tire in the executable software 33.

(804) The executable software 33 transmits an update message via the BT device 32 to the transfer device 21, thereby updating the protocol of the monitoring device of the corresponding tire in the transfer device 21.

When the newly replaced monitoring device 11 has a different protocol from the transfer device 21 and the executable software 33, one can also use the executable software 33 to change the protocol, thus ensuring normal operation of the invention.

According to the above description, it is clear that the invention has a simpler and more convenient setting method for the ID or protocol after the monitoring device 11 is replaced. Besides, since the monitoring device 11 and the transfer device 21 use RF signal transmissions, the invention has the advantage of lower power consumption than Bluetooth transmissions. The battery of the monitoring device 11 thus has a longer lifetime, thereby solving the problem of frequent tire uninstallations and installations.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

The invention claimed is:

1. A setting method of a tire detection data transmission system, the tire detection data transmission system that includes:

a plurality of monitoring devices, each of which includes a sensor, a signal converter, and a radio frequency (RF) transmitter; wherein the sensor detects the tire conditions of a vehicle and generates tire information, the tire information is converted by the signal converter into an RF signal and emitted by the RF transmitter, and the emitted RF signal includes at least the tire information and an identification code of the monitoring device;

a transfer device that has a RF receiver, a central processing unit (CPU), and a Bluetooth (BT) module; wherein the RF receiver receives the RF signal emitted by the monitoring device, the CPU collects the received RF signal into collective data of a plurality of tires, and the BT module converts the collective data into an RF signal and emits the RF signal; and a mobile communication device that has a BT device, executable software, and a display unit; wherein the BT device receives the BT signal sent from the BT module, restores the received BT signal into the collective data and sends the collective data to the executable software, the executable software breaks the collective data into the tire information and the identification code, both of which are then displayed on the display unit, the method comprising:
   a. starting the executable software;
   b. displaying a graphical interface for each of the tires on the display unit, each of the graphical interfaces including a mode setting option;
   c. selecting the mode setting option and entering an identification code for a corresponding monitoring device, thereby updating the identification code of the monitoring device for the corresponding tire in the executable software; and
   d. transmitting an update message from the executable software to the transfer device via the BT device to update the identification code of the monitoring device for the corresponding tire in the transfer device.

2. The setting method of claim 1, with the mode setting option being able to modify a communication protocol of the monitoring device, further comprising:
   a. starting the executable software;
   b. using a displaying program to show a graphical interface for each of the tires on the display unit, with each of the graphical interfaces including a mode setting option that has an item for modifying the communication protocol;
   c. selecting the item for modifying the communication protocol, and entering the communication protocol for a corresponding monitoring device, thereby updating the communication protocol for the monitoring device of the corresponding tire in the executable software; and
   d. transmitting an update message from the executable software to the transfer device via the BT device, thereby updating the communication protocol for the monitoring device of the corresponding tire in the transfer device.

3. The setting method of a tire detection data transmission system of claim 1, wherein the CPU has an RF decoding unit, a data holding unit, and a data integration unit; the RF decoding unit decodes the RF signal received by the RF receiver, restores the RF signal into the tire information and the identification code in a specific coding and stores the tire information and the identification code in the data holding unit; the data holding unit is overwritable, keeping only a last tire information according to the coding; and the data integration unit collects the multiple sets of tire information in the data holding unit into the collective data and outputs the collective data to the BT module.

4. The setting method of a tire detection data transmission system of claim 3, wherein the CPU further has a tire condition judging unit and an alarm unit, the tire condition judging unit is preset with a default value to be compared with the last tire information in the data holding unit, when the tire information exceeds a range of the default value the tire condition judging unit transmits an alarm signal to the alarm unit for the alarm unit to perform an alarm action.

5. The setting method of a tire detection data transmission system of claim 1, wherein the transfer device uses the BT module thereof to emit a BT pairing message, the BT device of the mobile communication device receives the BT pairing message and generates a corresponding data transmission command to complete pairing.

6. The setting method of a tire detection data transmission system of claim 5, wherein the BT module has a BT converter and a BT emitter, the BT converter converting the received collective data into a BT signal and the BT emitter emitting the BT signal to a paired mobile communication device.

7. The setting method of a tire detection data transmission system of claim 1, wherein the executable software contains a receiving program, an analyzing program, and a displaying program, the receiving program receives the collective data restored by the BT device, the analyzing program breaks the collective data into multiple sets of tire information and corresponding identification codes, the displaying program shows the tire information and the corresponding identification code in a corresponding displaying block of the display unit, and only a last set of tire information is displayed.

8. The setting method of a tire detection data transmission system of claim 7, wherein the executable software further has a trigger program for generating a data reading command to the BT device.

9. The setting method of a tire detection data transmission system of claim 8, wherein the display unit is a touch-controls screen, the displaying program shows a touch-control display interface on the display unit, and touch-control display interface has a graphical interface for each of the tires for the user to click for starting the trigger program to show the tire information of the corresponding tire therein.

* * * * *